United States Patent
Gibler et al.

(10) Patent No.: US 8,432,552 B2
(45) Date of Patent: *Apr. 30, 2013

(54) HIGH INTENSITY FABRY-PEROT SENSOR

(75) Inventors: William N. Gibler, The Woodlands, TX (US); Larry A. Jeffers, Minerva, OH (US); Richard L. Lopushansky, The Woodlands, TX (US); Frederick J. Gillham, The Woodlands, TX (US); Michel LeBlanc, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 344 days.

This patent is subject to a terminal disclaimer.

(21) Appl. No.: 12/862,635

(22) Filed: Aug. 24, 2010
(Under 37 CFR 1.47)

(65) Prior Publication Data
US 2011/0170112 A1    Jul. 14, 2011

Related U.S. Application Data

(63) Continuation-in-part of application No. 12/365,700, filed on Feb. 4, 2009, now Pat. No. 7,782,465, which is a continuation of application No. 11/377,050, filed on Mar. 16, 2006, now abandoned.

(60) Provisional application No. 60/662,202, filed on Mar. 16, 2005, provisional application No. 60/774,289, filed on Feb. 17, 2006.

(51) Int. Cl.
*G01B 9/02* (2006.01)
*G01L 1/24* (2006.01)

(52) U.S. Cl.
USPC ............................ 356/480; 356/35.5; 356/519

(58) Field of Classification Search .................. 356/35.5, 356/454, 480, 519; 250/227.19, 227.27; 359/578
See application file for complete search history.

(56) References Cited

U.S. PATENT DOCUMENTS

| | | | |
|---|---|---|---|
| 4,572,669 A | 2/1986 | James et al. | |
| 5,349,439 A | 9/1994 | Graindorge et al. | |
| 5,920,670 A | 7/1999 | Lee et al. | |
| 6,430,337 B1 | 8/2002 | Bergmann et al. | |
| 6,854,899 B1 | 2/2005 | Krah et al. | |
| 7,782,465 B2 * | 8/2010 | Gibler et al. ................. | 356/480 |
| 7,787,128 B2 | 8/2010 | Lopushansky | |
| 2002/0016536 A1 | 2/2002 | Benni | |
| 2003/0039428 A1 | 2/2003 | Okamoto et al. | |
| 2004/0086228 A1 | 5/2004 | Rumpf et al. | |
| 2005/0036742 A1 | 2/2005 | Dean et al. | |

OTHER PUBLICATIONS

Supplemented European Search Report and Opinion, PCT/US2006/009400, issued May 18, 2011.

* cited by examiner

*Primary Examiner* — Michael A Lyons
(74) *Attorney, Agent, or Firm* — Booth Albanesi Schroeder LLC

(57) ABSTRACT

A sensor assembly having an optical fiber, a lens in optical communication with the optical fiber, a reflective surface spaced from the lens, for reflecting light from the beam back to the lens, a partially reflective surface positioned between the reflective surface and the lens, the partially reflective surface for reflecting light from the beam back to the lens, and an alignment device for aligning the lens and reflective surface with respect to one another, such that light from the beam of light transmitted from the lens reflects from the reflective surface back to the lens. The alignment device can have a rotational component and a base component, where the rotational component rotates to align a beam of light transmitted from the lens. The rotational component can also cooperate with the base component to move axially with respect to the reflective surfaces to align the beam for optimum power.

20 Claims, 8 Drawing Sheets

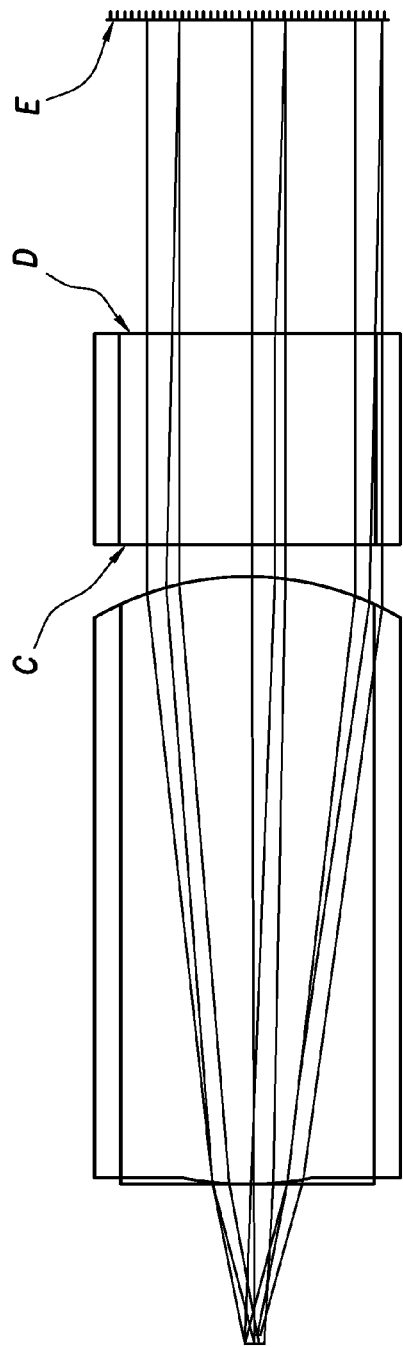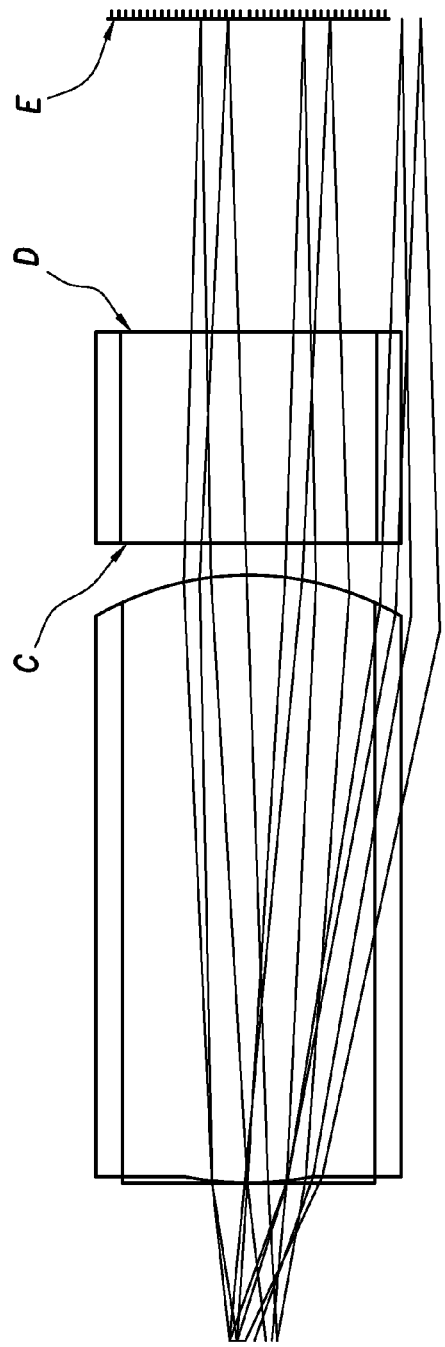

HIGH INTENSITY FABRY-PEROT SENSOR

CROSS-REFERENCE TO RELATED APPLICATIONS

This application is a Continuation In Part of U.S. patent application Ser. No. 12/365,700 to Gibler et al. filed on Feb. 4, 2009 now U.S. Pat. No. 7,782,465 which was a continuation of U.S. patent application Ser. No. 11/377,050 to Gibler et al. filed on Mar. 16, 2006 now abandoned. This application claims priority from U.S. Provisional Patent Application No. 60/662,202 filed on Mar. 16, 2005, which is hereby incorporated by reference, and claims priority from U.S. Provisional Patent Application No. 60/774,289 filed on Feb. 17, 2006, which is also hereby incorporated by reference.

FIELD OF INVENTION

The present invention relates to sensors for measuring the absolute length of a gap in a Fabry-Perot interferometer, and more particularly to a Fabry-Perot sensor that provides a more intense signal.

BACKGROUND OF THE INVENTION

The use of Fabry-Perot interferometers to measure the absolute length of a gap is known. Use of a ball lens to collimate light shining on a Fabry-Perot interferometer is needed for sensors measuring gaps exceeding about 30 um (micrometers) in order to maintain a uniform optical path length for all light rays and to assure a high percentage of the light reflected by the interferometer is captured by the fiber. However, if the light delivery fiber is not precisely centered on the ball lens axis or if the interferometer is not precisely perpendicular to the axis of the incident light transmitted by the ball lens, then the reflected light from the diaphragm does not re-enter the fiber because the reflected light spot that is re-imaged by the ball lens is not centered on the end of the input fiber. As a result, if insufficient light reflected from the sensor re-enters the fiber, the results from the Fabry-Perot interferometer-based sensor are compromised.

Accordingly, a Fabry-Perot interferometer-based sensor with a ball lens and alignment scheme that reflects high intensity light signals would provide benefits such as improved power budget, improved signal to noise ratio, and would be welcomed by the industry.

SUMMARY OF THE INVENTION

The present application discloses a sensor assembly that comprises an optical fiber having an optical axis, a lens in optical communication with the optical fiber, the lens having an optical axis and the lens capable of transmitting a beam of light, a reflective surface, the reflective surface spaced from the lens such that the beam of light transmitted from the lens is capable of reflecting from the reflective surface back to the lens, and an alignment device capable of aligning the beam of light transmitted from the lens substantially perpendicular with the reflective surface.

Another embodiment discloses a Fabry-Perot sensor assembly that comprises an optical fiber, a ball lens in optical communication with the optical fiber the ball lens capable of transmitting a beam of light, a window having a first surface and a second surface, a diaphragm spaced from and parallel to the second surface of the window, the diaphragm having a partially reflective surface, and an alignment device capable of aligning the beam of light transmitted from the ball lens substantially perpendicular with the partially reflective dielectric coating of the diaphragm.

In yet another embodiment, a sensor assembly comprises a body having a socket, a ball rotatably positioned in the socket of the body, an optical fiber, at least a portion of the optical fiber positioned in the ball, a ball lens attached to the optical fiber, the ball lens capable of transmitting a beam of light, a diaphragm having a reflective surface, the diaphragm spaced from the ball lens such that the beam of light transmitted by the ball lens is capable of reflecting from the surface of the diaphragm back to the ball lens, and wherein rotation of the ball aligns the beam of light transmitted from the ball lens substantially perpendicular with the reflective surface of the mesa diaphragm.

DESCRIPTION OF THE DRAWINGS

Operation may be better understood by reference to the following detailed description taken in connection with the following illustrations, wherein:

FIG. 3 is a ray trace drawing of a 2 mm diameter ball lens with de-centering of the delivery fiber relative to the ball lens and tilt of the diaphragm relative to the fiber, where the lens-to-window spacing 0.1 mm; the window thickness=0.7 mm; the window-reflector spacing (gap)=1 mm; the fiber de-center=0.05 mm; and the tilt angle=0.5°.

FIG. 4 is a ray trace drawing of a 2 mm diameter ball lens with de-centering of the delivery fiber relative to the ball lens and no tilt of the diaphragm relative to the fiber (i.e., reflected rays do not re-enter fiber), where the lens-window spacing 0.1 mm; the window thickness 0.7 mm; the window-reflector spacing (gap) 1 mm; the fiber de-center=0.05 mm; and the tilt angle=0.

DETAILED DESCRIPTION

While the present invention is described with reference to the embodiments described herein, it should be clear that the present invention should not be limited to such embodiments. Therefore, the description of the embodiments herein is illustrative of the present invention and should not limit the scope of the invention as claimed.

Figure 1A:
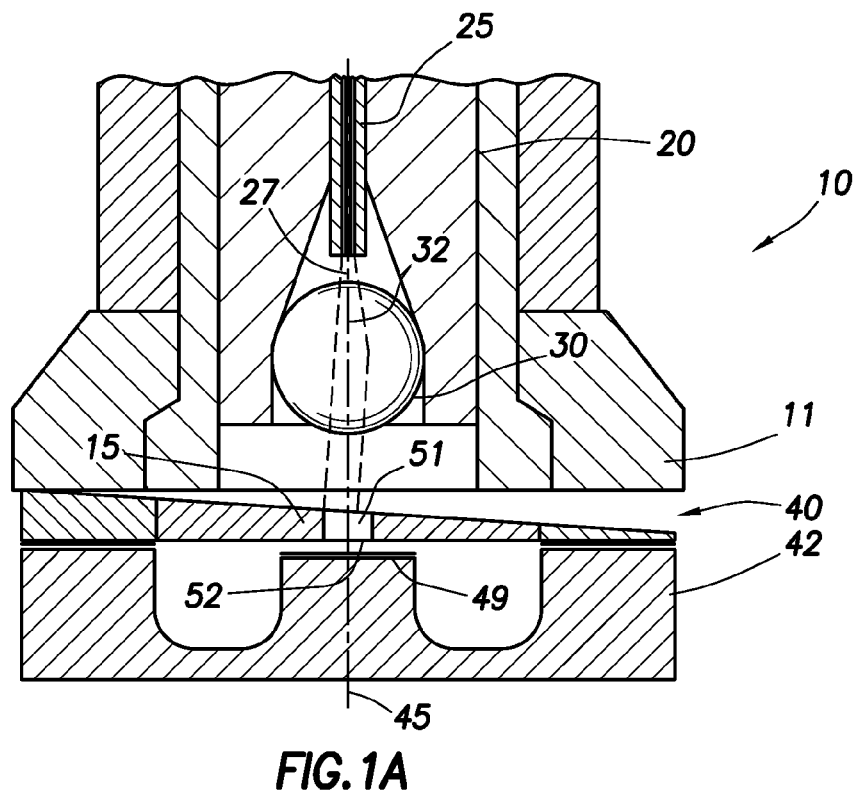
FIG. 1A is a concept drawing of a Fabry-Perot interferometer based sensor assembly with a ball lens and Fabry-Perot gap, wherein the window is a wedge with nonparallel surfaces.

To obtain the maximum light intensity using a Fabry-Perot interferometer based sensor, it is necessary to assure the optical fiber is precisely centered on the lens optical axis and the second reflector in the Fabry-Perot interferometer is precisely perpendicular to the beam of light transmitted from the lens. Since these conditions cannot be met precisely in manufacturing practice, certain adjustments are necessary to achieve these results. An embodiment of a Fabry-Perot interferometer based sensor 10 is shown in FIG. 1A. In this embodiment, a wedge shaped window assembly 15 is used rather than a plane-parallel window as an alignment device. The Fabry-Perot interferometer based sensor 10 comprises a transducer body 11, a ferrule 20, an optical fiber 25 having an optical fiber axis 27, a lens 30 having a lens optical axis 32, and a Fabry-Perot sensor 40. Despite only a ball lens being shown in FIG. 1, any sort of lens that focuses and collimates light can be used, e.g., a graded index lens or a ball lens. The Fabry-Perot sensor 40 comprises a wedge shaped window assembly 15 and a diaphragm 42 having an optical axis 45 and a reflective surface 49. The wedge shaped window assembly 15 comprises one surface 52 that serves as the first partial reflector in a Fabry-Perot interferometer where the window assembly 15 is located between the lens 30 and a second reflector 49 in the Fabry-Perot interferometer, which allows for proper operation of the invention with long gaps. Rotation of the wedge-shaped window assembly 15 causes a change in the angle of refraction into and out of the window assembly 15 until the window assembly 15 is in the precise rotational location where the column or beam of light transmitted from the lens 30, is perpendicular to the first reflective surface 52 on the window assembly 15. Additionally, the lens optical axis 32 is perpendicular to the surface 49 of the diaphragm 42, as well as the optical axis 27 of the optical fiber 25 being perpendicular to the first reflective surface 52 of the window assembly 15 and the surface 49 of the diaphragm 42.

Figure 1B:
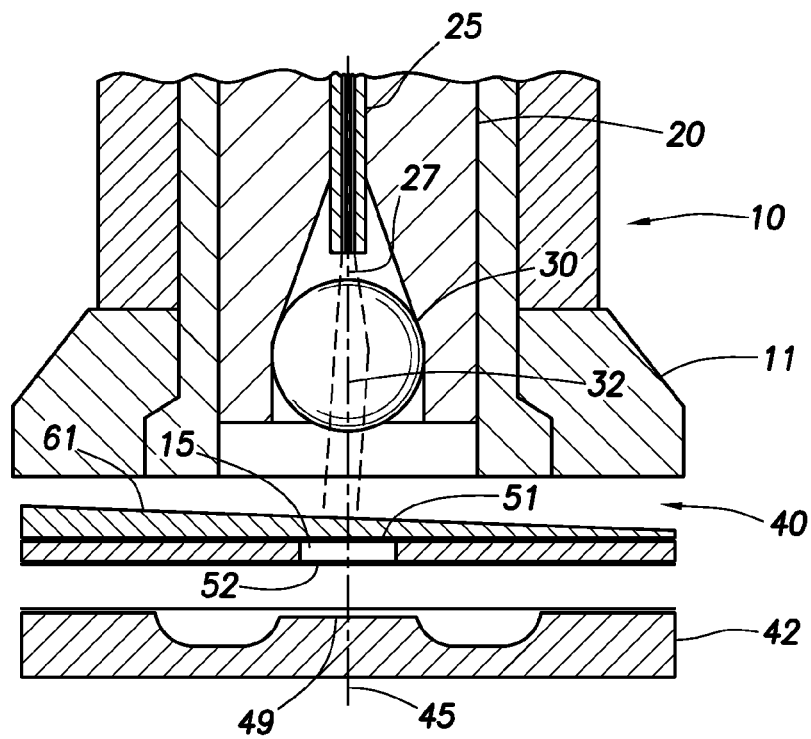
FIG. 1B is a concept drawing of a Fabry-Perot interferometer based sensor assembly with a ball lens, a Fabry-Perot gap, and a wedge-shaped spacer that is used with a window having parallel surfaces.

Alternatively, the window surfaces 51, 52 can be maintained parallel to each other and parallel to the second reflector surface 49 in the Fabry-Perot sensor. Plane-parallel windows are easier to manufacture. In this embodiment, the alignment device comprises a wedge-shaped spacer 61 located between the lens and the reflective surface as shown in FIG. 1 B. Accordingly, to provide the angle tuning, the wedge-shaped spacer 61 is inserted until the column or beam of light transmitted from the lens 30, is perpendicular to the reflective surface on the diaphragm. Spacers 61 with different wedge angles can be matched to different transducer bodies to correct for variation in manufacturing tolerances of the transducer bodies and to optimize light transmission.

Figure 2:
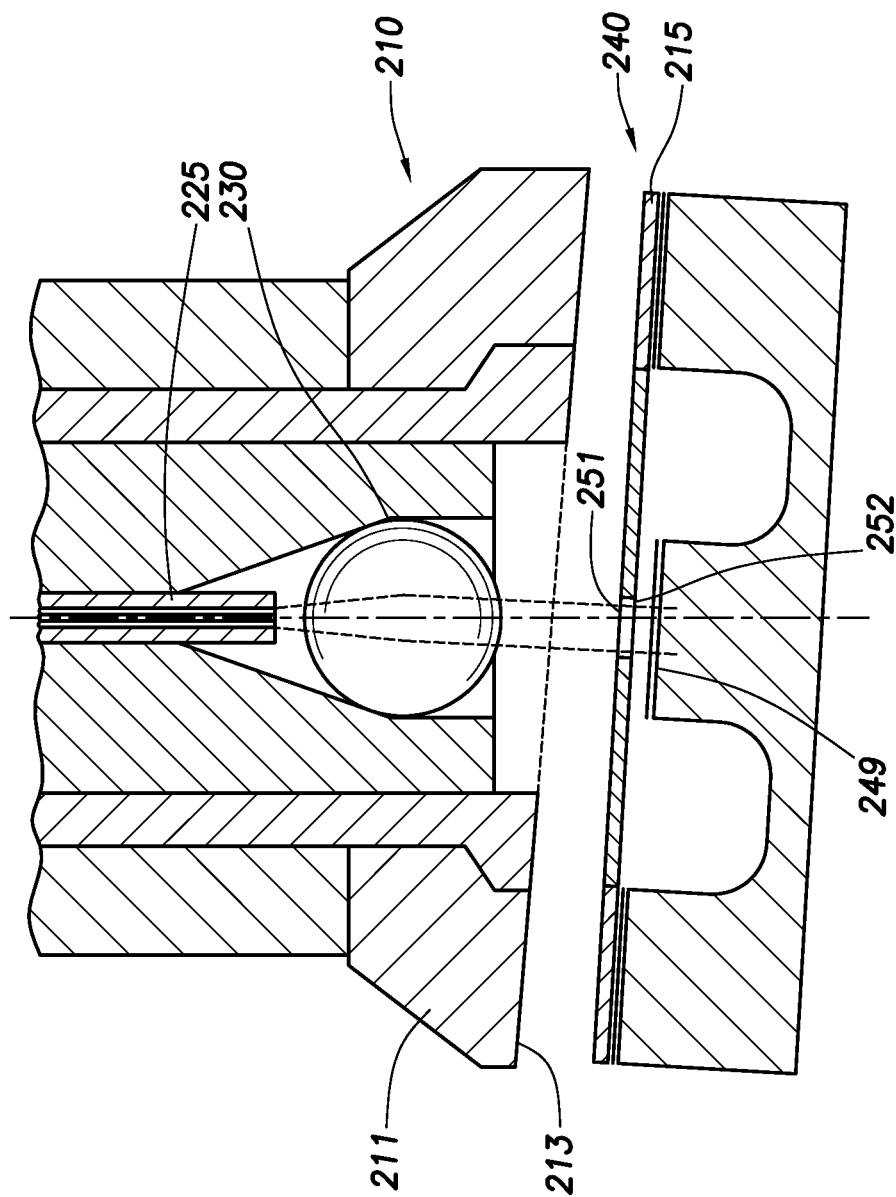
FIG. 2 is a concept drawing of sensor assembly with ball lens and Fabry-Perot gap, wherein the two surfaces of the window are plane parallel (where one surface is a first reflector in a Fabry-Perot interferometer) and the transducer body is machined at the desired angle to maximize the reflected light signal.

As shown in FIG. 2, another alternative embodiment of a Fabry-Perot interferometer based sensor 210 is shown. In this embodiment, the Fabry-Perot interferometer based sensor 210 maintains the window surfaces 251, 252 parallel to each other and parallel to the second reflector surface 249 in the Fabry-Perot sensor 240. To provide the angle tuning, the alignment device comprises a surface 213 of the transducer body 211 that mates with the window assembly 215 that is machined at the desired angle after the ball lens 230 and optical fiber 225 assembly are bonded. In this alternative embodiment, the window assembly 215 does not need to be rotated to bring the window 215 into precise alignment with the transducer 211. It is simply attached to the transducer body 211 at any rotational position. The transducer body 211 is machined at a predetermined angle to produce the desired tilt angle of the Fabry-Perot interferometer based sensor. In other words, the alignment device comprises the transducer body 211 having its end surface or face 213 machined at an angle relative to its axis to align the beam of light transmitted from the lens perpendicular with the reflective surface 249 of the diaphragm. The desired tilt angle of the transducer body 211 is also when a light beam transmitted from the ball lens 230 is perpendicular to the end face 213 of the transducer body 211. This ensures the light beam is perpendicular to the diaphragm surface 249, as shown in FIG. 2. This approach can also be used even when there is no ball lens and no window, to correct for any misalignment of the light beam with the transducer body and second reflector of the Fabry-Perot sensor, i.e. the diaphragm surface.

Figure 10:
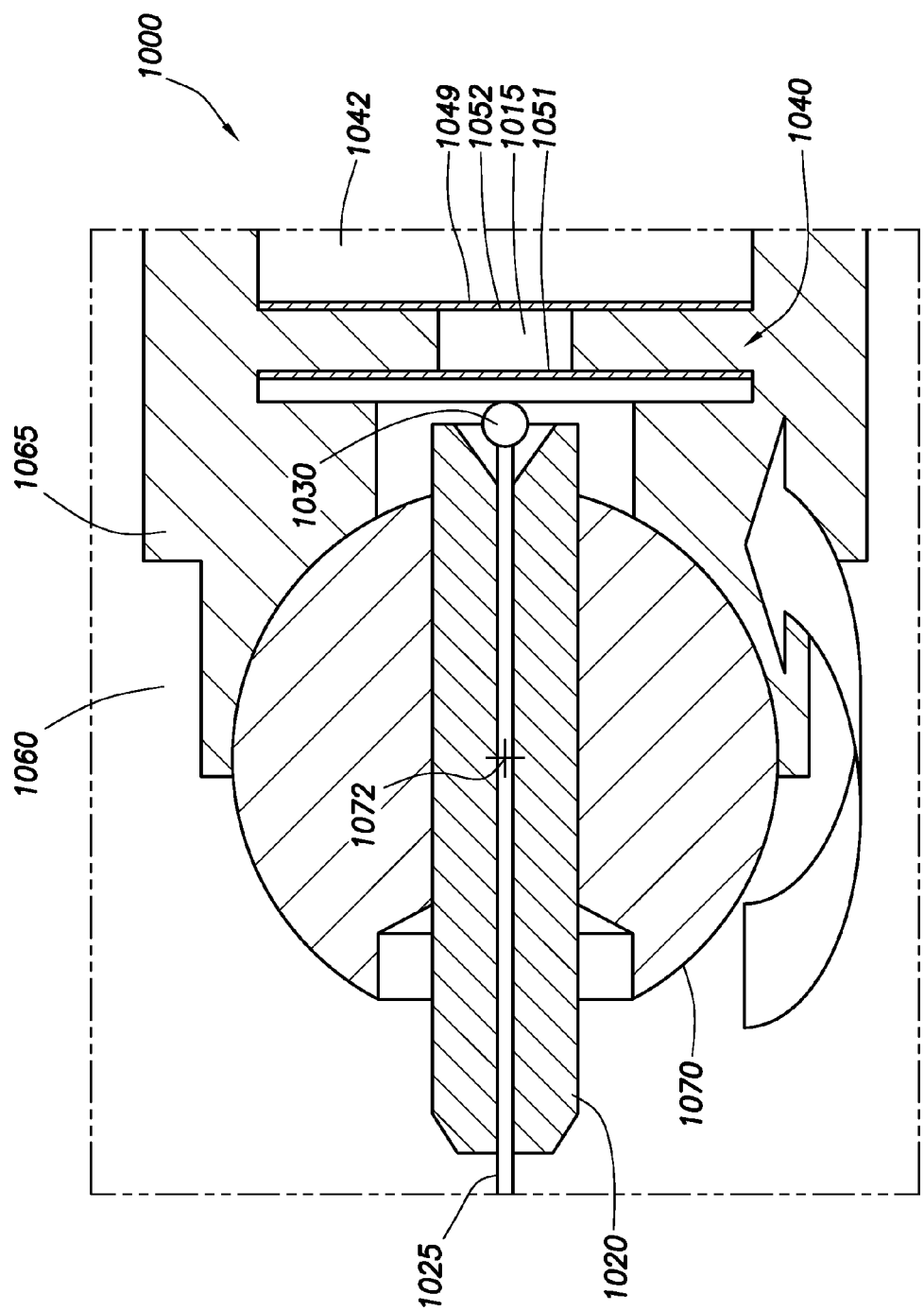
FIG. 10 shows a cross-section drawing of ball and socket alignment device of an optical fiber with fused ball lens.

In the yet another embodiment, the method for pointing the light beam to achieve perpendicularity with the diaphragm is to use a metal ball-and-socket assembly shown in FIG. 10. In this embodiment, the Fabry-Perot interferometer based sensor 1000 comprises a ferrule 1020, an optical fiber 1025, a lens 1030, a Fabry-Perot sensor 1040, and an alignment device. The alignment device comprises a body 1060 having a socket 1065, and a ball 1070. The Fabry-Perot sensor 1040 comprises a window assembly 1015 and a diaphragm 1042. The window assembly 1015 comprises one surface 1052 that serves as the first reflector in a Fabry-Perot interferometer where the window 1015 is between the lens 1030 and a second reflector 1049 in the Fabry-Perot interferometer. This allows for proper operation of the embodiment with long gaps. The window assembly 1015 also includes another surface 1051 parallel to the surface 1052. The ball 1070 can be a metal ball, but is not limited to such. It can be of any material. The ball 1070 is rotatably attached in the socket 1065. Held inside the metal ball 1070 is the ferrule 1020 that holds the optical fiber 1025 and lens 1030. The metal ball 1070 can be rotated in its mating socket 1065 through two degrees of freedom about the center-of-rotation 1072, as shown by the arrow. In this manner the light beam angle transmitted from the lens 1030 is fine-tuned to be perpendicular to the diaphragm 1042 surface 1049.

Various alternatives have been modeled using optical ray tracing software. In one embodiment, a 2 mm diameter ball lens that is configured according to the drawing in FIG. 3 has the design parameters presented in Table 1.

TABLE 1

Parameter definitions for design in FIG. 3.
For a lens with 2 mm FS ball w 0.7 mm thick window

| SRF | RADIUS | THICKNESS | APERTURE RADIUS | GLASS |
|---|---|---|---|---|
| OBJ | — | 0.530000 | 0.025000 | AIR |
| AST | 1.000000 | 2.000000 | 0.119528 AS | FK3 (fused silica) |
| 2 | −1.000000 | 0.100000 | 0.418365 S | AIR |
| 3 | — | 0.700000 | 0.420979 S | BK7 (glass) |
| 4 | — | 1.000000 | 0.433099 S | AIR |
| 5 | — | −1.000000 | 0.459240 S | REFL_HATCH* |
| 6 | — | −0.700000 | 0.485381 S | BK7 |
| 7 | — | −0.100000 | 0.497501 5 | AIR |
| 8 | −1.000000 | −2.000000 | 0.500115 5 | FK3 |
| 9 | 1.000000 | −0.530000 | 0.221589 S | AIR |
| IMS | — | | 0.060116 S | |

*TILT/DECENTER DATA

| 0 | DT 1 | DCX | — | DCY | 0.050000 | DCZ | — |
|---|---|---|---|---|---|---|---|
| | | TLA | — | TLB | — | TLC | — |
| 3 | DT 1 | DCX | — | DCY | — | DCZ | — |
| | | TLA | −0.500000 | TLB | — | TLC | — |
| 5 | DT 1 | DCX | — | DCY | — | DCZ | — |
| | | TLA | −0.500000 | TLB | — | TLC | — |
| 7 | DT 1 | DCX | — | DCY | — | DCZ | — |
| | | TLA | −0.500000 | TLB | — | TLC | — |

The tilt angle is an input parameter to the ray trace. The same tilt angle is applied to each window surface C and D and the reflector E. FIG. 4 shows what happens if the fiber de-center remains 0.05 mm and the tilt angle is set to 0. The reflected rays miss the end of the fiber. Compare FIG. 4 with FIG. 3, where the reflected rays re-enter the fiber. The object and image size in FIG. 3 is roughly 0.065 mm (total spot size, not rms). In FIG. 4, the size of the image (reflected spot) is roughly 0.115 mm and is not centered about the object (fiber end).

As previously discussed, a configuration to collimate light shining on the diaphragm of a fiber optic Fabry-Perot pressure sensor is shown in FIGS. 1 and 2. A light delivery fiber and a ball lens are not attached to one another.

In addition to the alignment issues caused by the non-attached ball lens and fiber, the non-attached case results in two unwanted reflective surfaces (the fiber end and the ball lens input surface) that could interfere with the desired signal from the Fabry-Perot sensor. In the embodiment shown in FIG. 10, the ball lens 1030 is attached to the optical fiber 1025. More specifically, the ball lens 1030 is fused and centered on the end of the optical fiber 1025 minimizing the de-centering problem and eliminating two unwanted reflective surfaces. A ball lens is fused to the silica optical fiber by heating the end of the fiber to the melting point. During melting of the fiber, surface tension produces a sphere of transparent silica, and when the melted silica refreezes, the ball lens is permanently fused to the end of the fiber. Alternatively, the ball lens 1030 can be bonded to the optical fiber 1025 using an adhesive. The typical diameter of the ball lens formed in this manner is 340/Lm.

Figure 5:
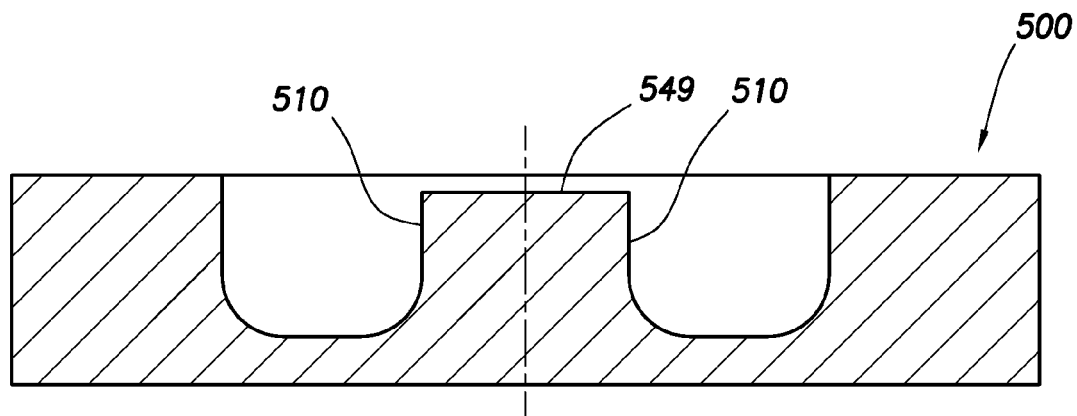
FIG. 5 shows a cross section of a second reflector in the Fabry-Perot interferometer with a mesa diaphragm configuration.
Figure 6:
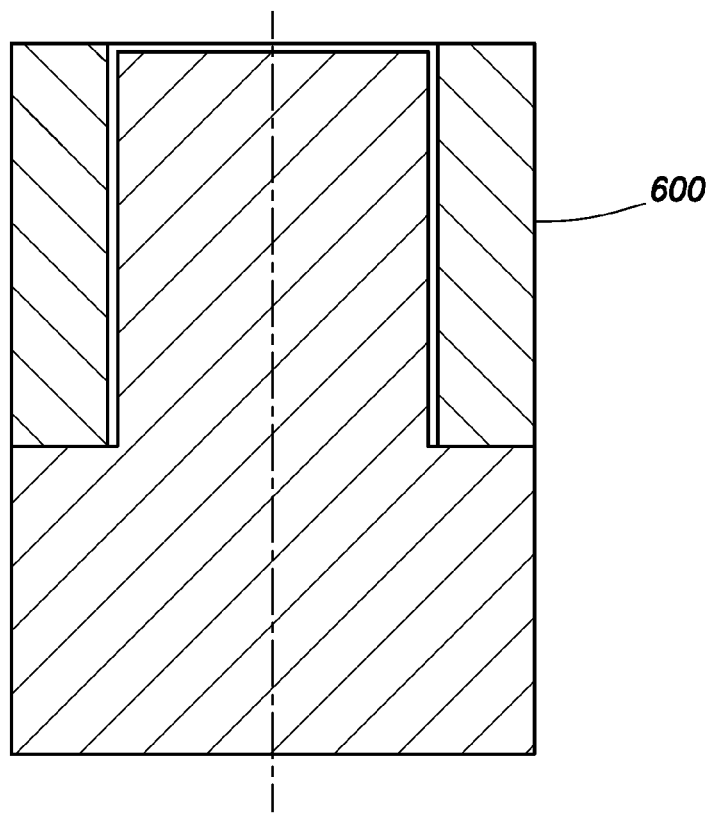
FIG. 6 shows a cross section of a second reflector in the Fabry-Perot interferometer with a plug diaphragm configuration.
Figure 7:
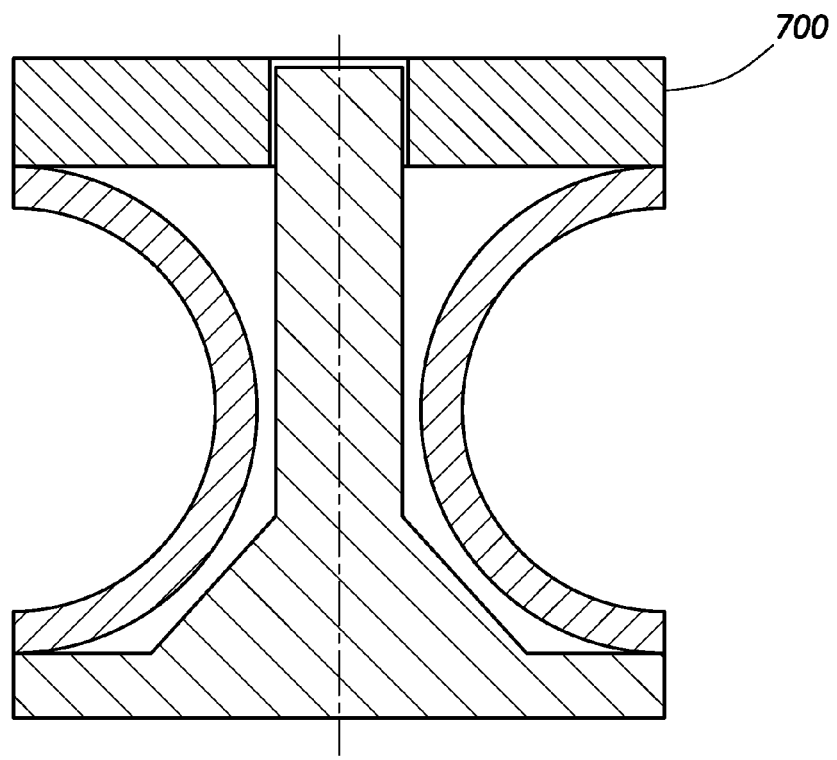
FIG. 7 shows a cross section of a second reflector in the Fabry-Perot interferometer with a bellows diaphragm configuration.

An additional way to improve the performance of the Fabry-Perot interferometer based sensor is to machine a feature (such as a circular groove) into the diaphragm that causes the surface of the diaphragm to translate without bending as the diaphragm deflects. This feature could be configured as a mesa 500 (which is the circular groove cut into the diaphragm substantially surrounding the flat mesa reflective surface of the diaphragm), a plug 600, or a bellows 700 as depicted in FIGS. 5, 6, and 7, respectively. As shown in FIG. 5, the mesa diaphragm 500 includes a circular groove 510 cut therein. As shown, the circular groove 510 surrounds the reflective surface 549 of the diaphragm 500.

Another way to improve the performance of the Fabry-Perot interferometer based sensor 10 is to attach a glass plate and/or dielectric coating 49 to the surface of the diaphragm 42 that allows the reflectance of the diaphragm 42 to be optimized and to remain uniform with time and temperature.

Figure 8:
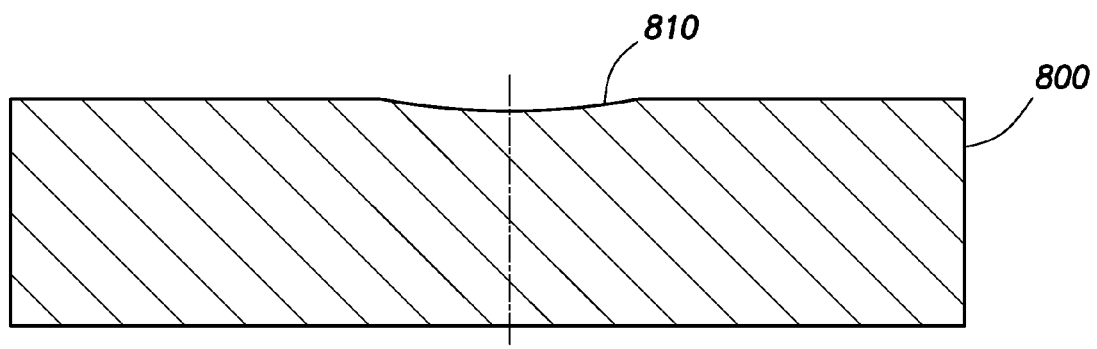
FIG. 8 shows a cross section of a second reflector in the Fabry-Perot interferometer with a spherical depression.

Additionally, the performance of the Fabry-Perot interferometer based sensor could be improved by machining a concave spherical depression 810 as depicted in FIG. 8 in the center of the diaphragm 800 to provide modal control of the Fabry-Perot gap. The depth of the spherical depression must be less than the minimum gap that is to be measured with the Fabry-Perot sensor.

Figure 9:
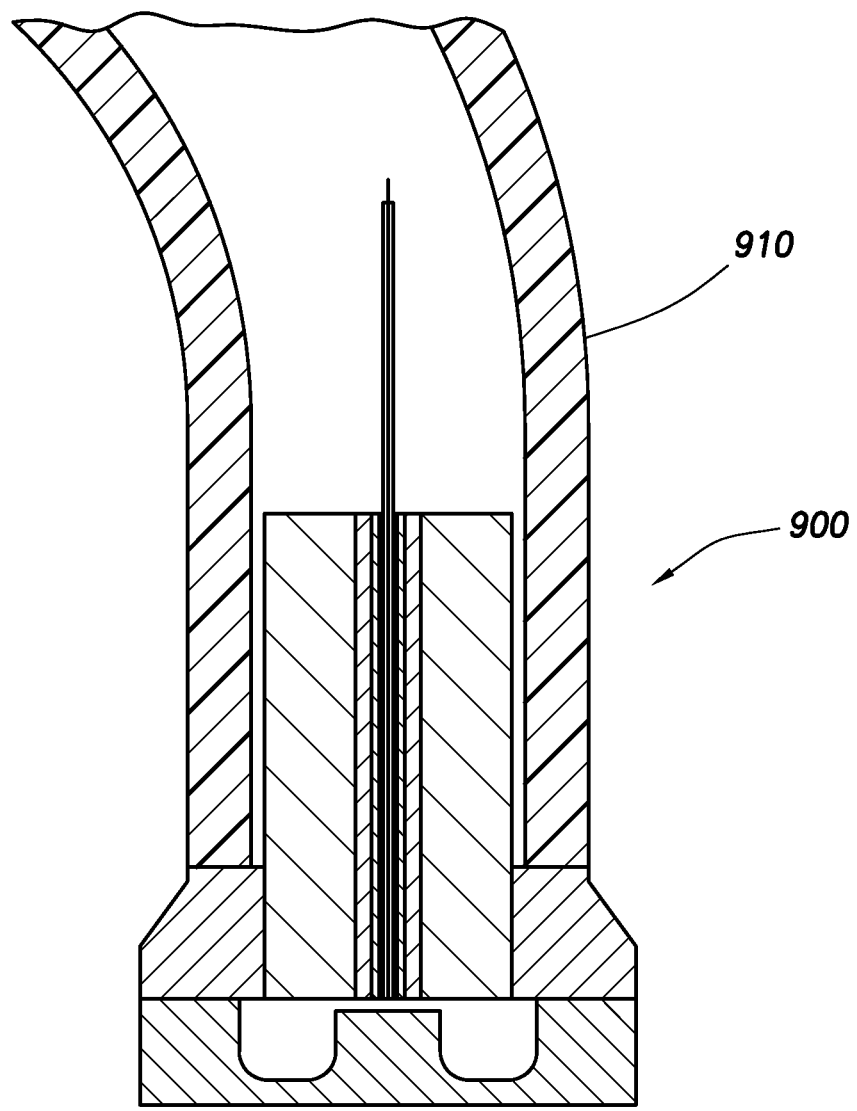
FIG. 9 shows a flexible transducer incorporating an embodiment of a Fabry-Perot interferometer based sensor.

The features of the second reflector in the Fabry-Perot interferometer based sensor combine to enable a transducer head 900 to be fabricated that is very short and very small in diameter. The small size allows the transducer head 900 to be placed on the end of a flexible probe 910 for use in locations where space and access are very limited, forming a flexible transducer. In gas turbine applications where pressure pulsations in the combustor are to be monitored, it is desirable to install the pressure transducers and other sensors as close as possible to the combustion zone. Combustor baskets in Siemens Westinghouse turbines contain J-tubes used to examine the combustor basket with a boroscope. A flexible transducer may be installed in this location but there are physical limitations to the size of the transducer head and the pigtail assembly that contains the leads. It is straightforward to design and build a fiber optic transducer that fits within the size envelope defined by the gas turbine combustor basket J-tube. One design is shown in FIG. 9. The size constraints include the diameter and length of the transducer and the flexibility of the pigtail assembly that must be pressure sealed.

Figure 11:
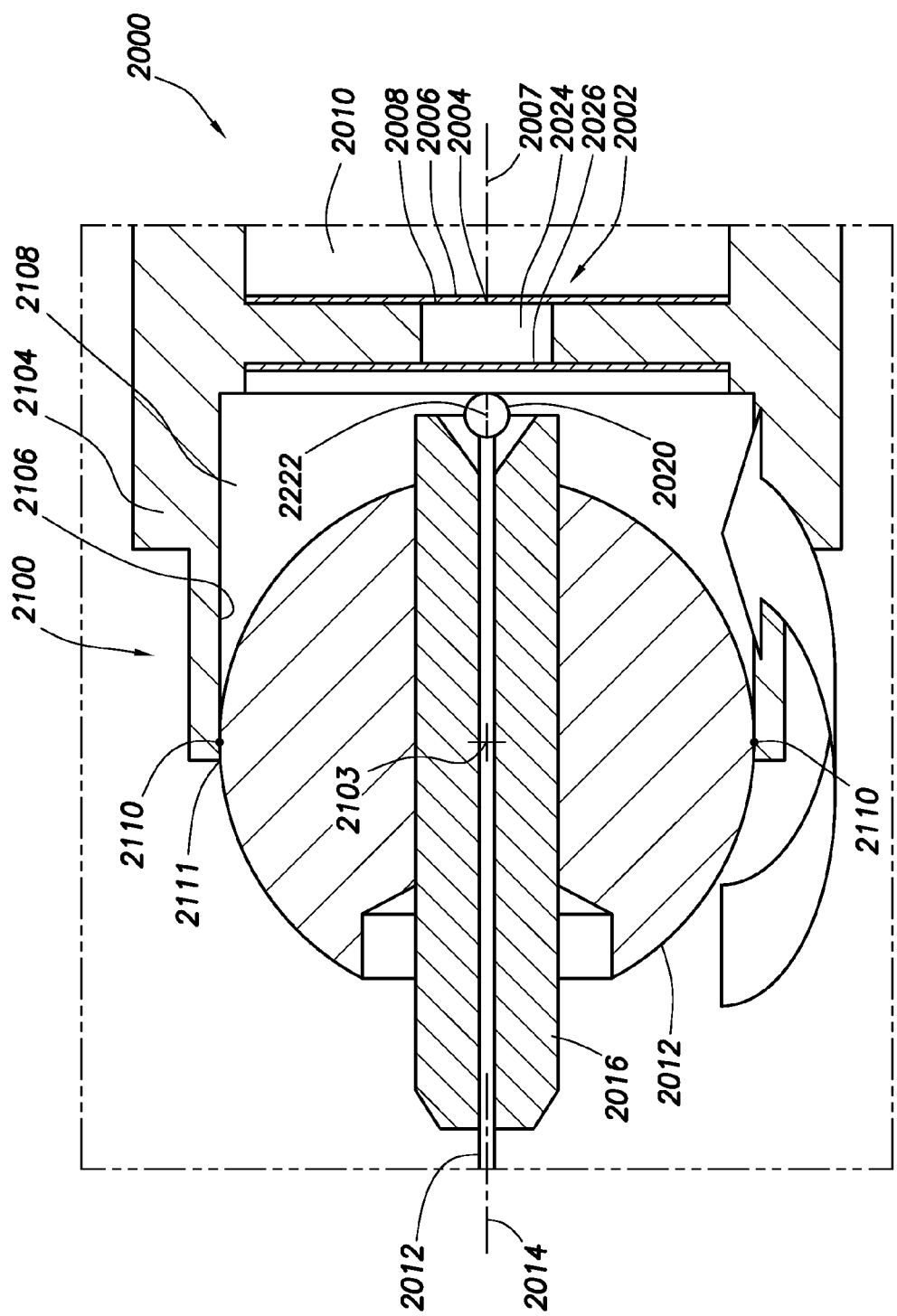
FIG. 11 shows a cross-section drawing of an embodiment of the device having an alignment device with three-degrees of movement.

FIG. 11 shows a cross-section diagram of an exemplary embodiment of the invention. The apparatus includes a Fabry-Perot sensor assembly 2000 and an alignment device 2100. The Fabry-Perot sensor assembly 2000 includes a Fabry-Perot sensor 2002 formed by the partially reflective first surface 2004 and reflective second surface 2006 which are spaced apart, defining a gap 2008. The reflective surfaces 2004 and 2006 are preferably substantially parallel to one another. The relative positions of the reflective surfaces will change during use as the diaphragm 2010 moves in response to changes in environmental parameters. Reflective surface 2006 has a reflective optical axis 2007. The optical fiber 2012 for transmitting light has an optical fiber axis 2014. The optical fiber 2012 can be encased, in whole or in part, by ferrule 2016. The lens 2020 for collimating or focusing light has a lens optical axis 2222. Lens 2020 can be of any kind known in the art, such as a ball lens, as shown, graded index lens or other. The lens 2020 is preferably attached to the optical fiber 2012. The lens 2020 may be attached by any method known in the art including those described herein. Alternately, the lens can be created by melting the free end of the optical fiber and then allowing it to harden. A window 2024 can be used between the lens 2020 and the reflective surface 2006; the window 2024 has an upper surface 2026. The partially reflective surface 2004 can be formed by or carried on the lower surface of the window 2024 in a preferred embodiment.

In FIG. 11, the alignment device 2100 comprises a rotational component 2102 which is movable with respect to a base component 2104 during alignment. In a preferred embodiment, the rotational component 2102 is of a generally spherical shape over at least a portion of its surface, as shown. Additionally, the rotational component can have machined or formed surfaces, apertures, and the like, such as for insertion of ferrule 2020, optical fiber 2025, mounting pieces, etc. Optical fiber 2012 and ferrule 2016 are positioned to extend through an aperture on the rotational component 2102 such that movement of the rotational component 2012 also moves the optical fiber 2012 and lens 2020. Movement of the rotational component 2102, therefore, changes the angle of incidence of a beam of light transmitted from the lens 2020 with respect to at least one of the reflective surfaces 2004, 2006. The rotational component is preferably made of metal but may be made of other materials. The rotational component 2102 has a center of rotation 2103 which, where the rotational component surface defines a sphere, preferably coincides with the center of the sphere.

The base component 2104 of the alignment device 2100 has an interior wall 2106 defining an interior space 2108. The interior wall 2106 is preferably cylindrical to allow for relative ease of movement of the rotational component 2102 in the interior space 2108 during alignment and for ease of attachment of the rotational component 2102 to the base component 2104. The base component 2104 is preferably also made of metal but can be of other material. The interior space 2108 of the base component is selected to be of a size to allow the rotational component 2102 to be positioned and moved within the interior space. For example, where the interior wall 2106 is cylindrical, the diameter of the cylinder is selected to be slightly larger than the effective diameter of the rotational component so the rotational component can move axially into the cylindrical space and moved axially towards and away from the reflective surfaces during alignment. The rotational component can be positioned entirely within the interior space 2108 or, as seen in FIG. 11, at least partially within the space.

After alignment, the rotational component 2102 is fixed in relation to the base component 2104. The rotational component is preferably attached to the base component 2104 by suitable method. The rotational component 2102 is preferably attached at attachment points 2110 located on the surface of the spherical portion of the rotational component. For example, where the components are of metal, the exterior surface of the rotational component 2102 can be spot-welded or soldered to the interior wall 2106 of the base component 2104 at attachment points 2110. The attachment points shown are exemplary only. Alternate attachment points can be along the rim 2111 of the base component 2104. The components can be attached to one another by mechanical method, such as by use of fasteners, or friction-fit, by deformation of the base component. Deformation can be by crimping or other plastic deformation of the base component. Alternately, deformation can be non-permanent, such as by a clamping device, such as one or more compression bands tightened with tightening screws. Longitudinal slots formed in or on the interior wall 2106 can be used to facilitate a friction fit, especially during permanent or non-permanent deformation of the base component 2104. For attachment by spot-welding, soldering, deformation of the base component and the like, it is preferable that the location of the attachment points be along a circumference of the rotational component so stresses caused by attachment is radial and does not cause appreciable change in the alignment while attaching the components to one another. Alternately, the components can be attached to one another by chemical compounds, such as adhesive, epoxy, glue, etc.

During fabrication of the Fabry-Perot interferometer based sensor 10, it is necessary to align the beam of light transmitted from the lens 2020 with the reflective surfaces 2004 and 2006 such that light is reflected from the surfaces back into the lens 2020 and optical fiber 2012. Alignment is achieved, in the embodiment seen in FIG. 11, by rotation and axial movement of the rotational component. The rotational component can be rotated through two degrees of freedom, just as permitted by the ball-and-socket embodiment as seen in FIG. 10. Rotation through one or both of these degrees of freedom allows for a beam of light transmitted from the lens 202 to be aligned angularly as described above.

Additionally, the rotational component 2102 can be moved axially, towards and away from the reflective surfaces, during alignment. During alignment, the rotational component 2102 is moved so that it is positioned at least partially in the interior space 2108 of the base component 2104, as shown. In a preferred method, the rotational component is moved toward the reflective surface 2006 until further movement is blocked by a stop. For example, in FIG. 11, the upper surface 2026 of the window 2024 acts as a stop, delimiting further axial movement of the ferrule 2016 and/or lens 2020 towards the reflective surfaces 2004, 2006. Other parts of the apparatus can act as motion delimiters, or stops, such as shoulders or surfaces designed for that purpose, the window 2026 when present, the partially reflective surface, etc. Further, the lens, ferrule, or a part of the rotational component can contact the stop, thereby stopping further axial movement. In the preferred embodiment shown, when the ferrule and/or lens 2020 contact the upper surface 2026 of the window 2024, alignment continues by moving the rotational component 2102 axially away from the reflective surface 2006. This step is taken while light is transmitted through the optical fiber and lens, such that a beam of light is transmitted from the lens. The rotational component is moved, both axially and rotationally, as needed, until the beam is aligned such that the beam is reflected by the reflective surfaces 2004 and 2006 back into the optical fiber. In one embodiment, the beam is aligned such that it is perpendicular to at least one of the reflective surfaces. Further, movement of the rotational component axially allows positioning of the lens to achieve an optimal axial position. In a preferred method, the optimal position is selected to optimize power while still maintaining the lens a safe distance from the window upper surface 2026.

Alignment of the beam in relation to the reflective surface or surfaces is necessary since the fiber and lens will not create a perfectly collimated (or focused) beam of light. Consequently, due to the divergence of the beam of light, it is preferable to position the lens as close to the window surface and/or reflective surfaces as possible during the alignment process. The method described above is performed while transmitting a beam of light from the lens onto the reflective surfaces and analyzing the signal received from the back-reflected light. That is, the method is not performed by direct observation of the lens' position with respect to the Fabry-Perot sensor. For example, a broad-band signal is utilized and the spectral reflectance is measured and observed. The closer the lens is to the reflective surface, without touching anything (such as surface 2026 when present), the stronger the reflected signal. As the rotational component 2102, and the lens 2020, is moved axially towards the reflective surface 2004, the back-signal increases in strength. When the lens contacts the window surface 2026, it causes distortion of the signal. The rotational component can then be moved axially away from the window a minimum safe distance, selected to prevent contact between the lens and window surface during use. Thus an optimal signal is achieved while still maintaining the lens in a position to prevent damage.

While the present invention has been described with reference to the preferred embodiment, obviously other embodiments, modifications, and alternations could be ascertained by one skilled in the art upon reading the present disclosed. The present invention is intended to cover these other embodiments, modifications, and alterations that fall within the scope of the invention upon a reading and understanding of this specification.

Having thus described the invention, we claim:

1. A sensor assembly comprising:
   an optical fiber capable of transmitting light;
   a lens in optical communication with the optical fiber, the lens positioned to receive light emitted from the optical fiber, the lens operable to transmit a beam of light;
   a reflective surface spaced from the lens, for reflecting light from the beam back to the lens;
   a partially reflective surface positioned between the reflective surface and the lens, the partially reflective surface for reflecting light from the beam back to the lens; and
   an alignment device for aligning the lens and reflective surface with respect to one another, such that light from the beam of light transmitted from the lens reflects from the reflective surface back to the lens.

2. The sensor assembly of claim 1, wherein the lens comprises at least one of: a ball lens; a graded index lens; a lens that focuses light; and a lens that collimates lights.

3. The sensor assembly of claim 1, wherein the lens is attached to the optical fiber.

4. The sensor assembly of claim 1, wherein the lens is a ball lens and is formed by melting the end of the optical fiber and then allowing the melted end to harden.

5. The sensor of claim 1, wherein the alignment device is rotatable to align the beam of light transmitted from the lens substantially perpendicular with the reflective surface.

6. The sensor assembly of claim 1, wherein the alignment device comprises a wedge shaped member located between the lens and the reflective surface, the wedge-shaped member operable to align the beam of light transmitted from the lens.

7. The sensor assembly of claim 1, wherein the alignment device comprises a transducer body having an axis and an end surface, the end surface at an angle relative to the transducer body axis.

8. The sensor assembly of claim 1, wherein the alignment device comprises a rotational component and base component, the optical fiber attached to the rotational component.

9. The sensor assembly of claim 8, wherein the rotational component and base component comprise a ball and socket assembly.

10. The sensor assembly of claim 8, wherein the rotational component enables movement of the lens through at least two degrees of freedom.

11. The sensor assembly of claim 8, wherein the base component has an interior wall defining an interior space.

12. The sensor assembly of claim 11, wherein the base component interior wall is cylindrical.

13. The sensor assembly of claim 11, wherein at least a portion of the rotational component extends into the interior space of the base component.

14. The sensor assembly of claim 13, wherein the rotational component is movable axially towards and away from the reflective surface, thereby allowing alignment of a beam of light transmitted from the lens.

15. The sensor assembly of claim 14, wherein the lens is positioned axially with respect to the reflective surface to an optimal axial position.

16. The sensor assembly of claim 15, wherein the optimal axial position optimizes power while maintaining the lens a minimum distance from a surface.

17. The sensor assembly as in claim 16 wherein the surface is a surface of a window assembly.

18. The sensor assembly as in claim 15, wherein the rotational component is attachable to the base component.

19. The sensor assembly of claim 18, wherein the rotational component is attachable to the base component by at least one of: welding, soldering, mechanical means, friction fit, and deformation of the base component.

20. A method of aligning a beam of light transmitted from a lens with respect to at least one reflective surface spaced from the lens, such that light from the beam is reflected back to the lens, the method comprising the steps of:
   a) transmitting light through an optical fiber and into a lens;
   b) transmitting light through the lens and creating a beam of light exiting the lens;
   c) reflecting light from the beam off of a reflective surface;
   d) reflecting light from the beam off a partially reflective surface positioned between the reflective surface and the lens; and
   e) aligning the beam such that light from the beam is reflected off the reflective surface and back to the lens and light from the beam is reflected off the partially reflective surface back to the lens, wherein the step of aligning comprises, while transmitting a beam of light from the lens:
   1) rotating a rotational component, the optical fiber and lens attached to the rotational component; and
   2) axially moving the rotational component with respect to the reflective surface.

* * * * *